(12) United States Patent
Parivar et al.

(10) Patent No.: US 9,886,116 B2
(45) Date of Patent: Feb. 6, 2018

(54) GESTURE AND TOUCH INPUT DETECTION THROUGH FORCE SENSING

(75) Inventors: Nima Parivar, South San Francisco, CA (US); Wayne C. Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 13/559,577

(22) Filed: Jul. 26, 2012

(65) Prior Publication Data

US 2014/0028575 A1 Jan. 30, 2014

(51) Int. Cl.
*G06F 3/041* (2006.01)
*G06F 3/044* (2006.01)
*G06F 3/0488* (2013.01)

(52) U.S. Cl.
CPC ............ *G06F 3/0414* (2013.01); *G06F 3/044* (2013.01); *G06F 3/04883* (2013.01); *G06F 3/04886* (2013.01); *G06F 2203/04105* (2013.01); *G06F 2203/04106* (2013.01); *G06F 2203/04108* (2013.01)

(58) Field of Classification Search
CPC .... G06F 3/0414; G06F 3/044; G06F 3/04883; G06F 3/04886; G06F 2203/04105; G06F 2203/04106; G06F 2203/04108
USPC .................................................. 345/156, 173
See application file for complete search history.

(56) References Cited

U.S. PATENT DOCUMENTS

| | | | |
|---|---|---|---|
| 3,176,241 A | 3/1965 | Hogan | |
| 4,558,757 A * | 12/1985 | Mori | G06F 3/0414 177/199 |
| 4,577,174 A | 3/1986 | Lemmer | |
| 4,716,393 A | 12/1987 | Logie | |
| 4,897,582 A | 1/1990 | Otten et al. | |
| 5,052,844 A | 10/1991 | Kendall | |
| 5,231,336 A | 7/1993 | van Namen | |
| 5,541,372 A * | 7/1996 | Baller | G06F 3/0414 178/18.01 |

(Continued)

FOREIGN PATENT DOCUMENTS

| | | |
|---|---|---|
| CN | 1659583 | 8/2005 |
| CN | 101477422 A | 7/2009 |

(Continued)

OTHER PUBLICATIONS

"Immersion Announces MOTIV™ Development Platform for Android," retrieved from the Internet: URL:http://ir.immersion.com/releasedetail.cfm?sh_email=no&releaseid=549080, Feb. 10, 2011.

(Continued)

*Primary Examiner* — Benyam Ketema
(74) *Attorney, Agent, or Firm* — Brownstein Hyatt Farber Schreck, LLP

(57) ABSTRACT

A computing device configured detect a user input. The computing device includes a processor, a touch interface in communication with the processor and configured to detect a touch signal corresponding to an object approaching or contacting a surface, and at least three force sensors in communication with the processor and configured to detect a force signal corresponding to an object exerting a force on the surface. In response to the force the at least processor determines a force centroid location and the touch signals are processed by the processor by analyzing the force centroid location.

19 Claims, 10 Drawing Sheets

(56) References Cited

U.S. PATENT DOCUMENTS

| | | |
|---|---|---|
| 5,805,138 A | 9/1998 | Brawne |
| 5,999,168 A | 12/1999 | Rosenberg et al. |
| 6,100,874 A | 8/2000 | Schena et al. |
| 6,219,038 B1 | 4/2001 | Cho |
| 6,337,678 B1 | 1/2002 | Fish |
| 6,388,655 B1 | 5/2002 | Leung |
| 6,492,979 B1 * | 12/2002 | Kent .................... G06F 3/0414 178/18.01 |
| 6,518,954 B1 | 2/2003 | Chen |
| 6,816,049 B2 | 11/2004 | Watanabe |
| 6,937,124 B1 | 8/2005 | Nakamura |
| 6,940,494 B2 | 9/2005 | Hoshino et al. |
| 7,031,592 B2 | 4/2006 | Akieda |
| 7,091,886 B2 | 8/2006 | DePue |
| 7,152,482 B2 | 12/2006 | Ueno |
| 7,176,897 B2 | 2/2007 | Roberts |
| 7,219,549 B2 | 5/2007 | Honkura et al. |
| 7,245,293 B2 | 7/2007 | Hoshino et al. |
| 7,283,120 B2 | 10/2007 | Grant |
| 7,290,694 B2 | 11/2007 | Kirby et al. |
| 7,436,396 B2 | 10/2008 | Akieda |
| 7,443,384 B2 | 10/2008 | Harada |
| 7,511,706 B2 | 3/2009 | Schena |
| 7,525,532 B2 | 4/2009 | Liu et al. |
| 7,532,202 B2 | 5/2009 | Roberts |
| 7,557,051 B2 | 7/2009 | Ryu |
| 7,567,232 B2 | 7/2009 | Rosenberg |
| 7,639,232 B2 | 12/2009 | Grant et al. |
| 7,685,538 B2 | 3/2010 | Fleck et al. |
| 7,692,078 B2 | 4/2010 | Hayashi |
| 7,710,397 B2 | 5/2010 | Krah et al. |
| 7,791,506 B2 | 9/2010 | Riihimaki |
| 7,825,903 B2 | 11/2010 | Anastas et al. |
| 7,877,707 B2 | 1/2011 | Westerman |
| 7,920,225 B2 | 4/2011 | Nishikawa et al. |
| 7,948,337 B2 | 5/2011 | Chu |
| 7,952,566 B2 | 5/2011 | Poupyrev |
| 8,059,104 B2 | 11/2011 | Shahoian |
| 8,081,156 B2 | 12/2011 | Ruettiger |
| 8,084,968 B2 | 12/2011 | Murray et al. |
| 8,117,912 B2 | 2/2012 | Kawakubo |
| 8,132,468 B2 | 3/2012 | Radivojevic |
| 8,139,038 B2 | 3/2012 | Chueh |
| 8,144,129 B2 | 3/2012 | Hotelling |
| 8,169,401 B2 | 5/2012 | Hardwick |
| 8,169,402 B2 | 5/2012 | Shahoian et al. |
| 8,232,969 B2 | 7/2012 | Grant |
| 8,252,695 B2 | 8/2012 | Tan |
| 8,260,337 B2 * | 9/2012 | Periyalwar et al. .......... 455/517 |
| 8,264,465 B2 | 9/2012 | Grant et al. |
| 8,279,175 B2 | 10/2012 | Kim et al. |
| 8,287,522 B2 | 10/2012 | Moses et al. |
| 8,291,776 B1 | 10/2012 | Pickens |
| 8,296,670 B2 | 10/2012 | Matthews et al. |
| 8,310,350 B2 | 11/2012 | Pfau et al. |
| 8,310,452 B2 | 11/2012 | Takenaka et al. |
| 8,319,727 B2 | 11/2012 | Norieda |
| 8,373,664 B2 | 2/2013 | Wright |
| 8,378,798 B2 | 2/2013 | Bells et al. |
| 8,378,965 B2 | 2/2013 | Gregorio et al. |
| 8,400,410 B2 | 3/2013 | Taylor |
| 8,421,567 B2 | 4/2013 | Eckl et al. |
| 8,482,381 B2 | 7/2013 | Chatterjee et al. |
| 8,487,759 B2 | 7/2013 | Hill |
| 8,488,308 B2 | 7/2013 | LeVasseur |
| 8,502,547 B2 | 8/2013 | Philipp |
| 8,536,978 B2 | 9/2013 | Coggill |
| 8,570,162 B2 | 10/2013 | Ujii |
| 8,570,297 B2 | 10/2013 | Bulea |
| 8,581,901 B2 | 11/2013 | Joshi |
| 8,587,542 B2 | 11/2013 | Moore |
| 8,633,901 B2 | 1/2014 | Orr et al. |
| 8,633,911 B2 | 1/2014 | Schediwy et al. |
| 8,633,916 B2 | 1/2014 | Bernstein et al. |
| 8,648,816 B2 | 2/2014 | Homma et al. |
| 8,671,782 B2 | 3/2014 | Mink |
| 8,686,839 B2 | 4/2014 | Posamentier |
| 8,686,961 B2 | 4/2014 | Yamano |
| 8,717,152 B2 | 5/2014 | Bhatia et al. |
| 8,783,106 B1 | 7/2014 | Nielson et al. |
| 8,810,522 B2 | 8/2014 | Tse |
| 8,836,648 B2 * | 9/2014 | Wilairat ........................ 345/173 |
| 8,854,317 B2 | 10/2014 | Homma et al. |
| 8,892,051 B2 | 11/2014 | Yi et al. |
| 8,898,564 B2 | 11/2014 | Grant |
| 8,901,783 B2 | 12/2014 | Gregory et al. |
| 8,907,661 B2 | 12/2014 | Maier |
| 8,915,422 B1 | 12/2014 | Harty |
| 8,976,537 B2 | 3/2015 | Ito |
| 9,001,060 B2 | 4/2015 | Harris |
| 9,013,430 B2 | 4/2015 | McCann |
| 9,030,419 B1 * | 5/2015 | Freed .................... G06F 3/0416 345/156 |
| 9,054,627 B2 | 6/2015 | Bosch et al. |
| 9,086,740 B2 | 7/2015 | Furukawa |
| 9,110,532 B2 | 8/2015 | Ando et al. |
| 9,122,325 B2 | 9/2015 | Peshkin |
| 9,122,345 B2 | 9/2015 | Chen |
| 9,128,523 B2 | 9/2015 | Buuck |
| 9,148,190 B1 | 9/2015 | Buuck et al. |
| 9,164,605 B1 * | 10/2015 | Pirogov .................. G06F 3/041 |
| 9,207,801 B2 | 12/2015 | Schediwy et al. |
| 9,222,693 B2 | 12/2015 | Gourlay |
| 9,223,471 B2 | 12/2015 | Buxton |
| 9,282,893 B2 | 3/2016 | Longinotti-Buitoni et al. |
| 9,298,260 B2 | 3/2016 | Karaoguz |
| 9,304,587 B2 | 4/2016 | Wright et al. |
| 9,348,473 B2 | 5/2016 | Ando |
| 9,349,552 B2 | 5/2016 | Huska |
| 9,360,968 B2 | 6/2016 | Wright |
| 9,372,543 B2 | 6/2016 | Behles |
| 9,389,686 B2 | 7/2016 | Zoller |
| 9,454,256 B2 | 9/2016 | Fisher et al. |
| 9,798,409 B1 | 10/2017 | Wells et al. |
| 2003/0210235 A1 * | 11/2003 | Roberts ................ G06F 3/0414 345/173 |
| 2004/0080494 A1 | 4/2004 | Fahlman |
| 2006/0238517 A1 * | 10/2006 | King .................... G06F 1/1626 345/173 |
| 2007/0152966 A1 | 7/2007 | Krah et al. |
| 2008/0018611 A1 | 1/2008 | Serban et al. |
| 2008/0068343 A1 | 3/2008 | Hoshino et al. |
| 2008/0084384 A1 | 4/2008 | Gregorio et al. |
| 2008/0165159 A1 | 7/2008 | Soss et al. |
| 2008/0191648 A1 | 8/2008 | Ito et al. |
| 2008/0297478 A1 | 12/2008 | Hotelling et al. |
| 2009/0002199 A1 | 1/2009 | Lainonen et al. |
| 2009/0115734 A1 | 5/2009 | Fredriksson |
| 2009/0167704 A1 | 7/2009 | Terlizzi et al. |
| 2009/0174672 A1 | 7/2009 | Schmidt |
| 2009/0225046 A1 | 9/2009 | Kim |
| 2009/0242282 A1 | 10/2009 | Kim |
| 2009/0243817 A1 * | 10/2009 | Son ........................ 340/407.2 |
| 2009/0316380 A1 | 12/2009 | Armstrong |
| 2009/0322183 A1 | 12/2009 | Kawakubo |
| 2010/0053116 A1 * | 3/2010 | Daverman ............ G06F 3/0414 345/175 |
| 2010/0107067 A1 * | 4/2010 | Vaisanen ............... G06F 3/0486 715/702 |
| 2010/0141408 A1 | 6/2010 | Doy et al. |
| 2010/0149111 A1 | 6/2010 | Olien |
| 2010/0149124 A1 | 6/2010 | Kim |
| 2010/0164959 A1 * | 7/2010 | Brown ................ G06F 3/04886 345/473 |
| 2010/0182263 A1 | 7/2010 | Aunio et al. |
| 2010/0214239 A1 | 8/2010 | Wu |
| 2010/0225600 A1 | 9/2010 | Dai et al. |
| 2010/0245254 A1 | 9/2010 | Olien et al. |
| 2010/0302172 A1 * | 12/2010 | Wilairat ............... G06F 3/04883 345/173 |
| 2010/0328229 A1 | 12/2010 | Weber |
| 2011/0057899 A1 * | 3/2011 | Sleeman et al. ............. 345/174 |
| 2011/0163985 A1 | 7/2011 | Bae et al. |
| 2011/0205163 A1 * | 8/2011 | Hinckley et al. ........... 345/173 |

(56) References Cited

U.S. PATENT DOCUMENTS

| | | | |
|---|---|---|---|
| 2011/0209099 A1* | 8/2011 | Hinckley | G06F 3/0483 715/863 |
| 2011/0227872 A1* | 9/2011 | Huska | G06F 3/016 345/174 |
| 2011/0248916 A1 | 10/2011 | Griffin | |
| 2012/0013531 A1 | 1/2012 | Wilson | |
| 2012/0038568 A1 | 2/2012 | Colloms et al. | |
| 2012/0050230 A1 | 3/2012 | Harris | |
| 2012/0062491 A1 | 3/2012 | Coni et al. | |
| 2012/0105358 A1* | 5/2012 | Momeyer et al. | 345/174 |
| 2012/0105367 A1 | 5/2012 | Son et al. | |
| 2012/0133496 A1 | 5/2012 | Aono | |
| 2012/0154315 A1 | 5/2012 | Aono | |
| 2012/0139860 A1 | 6/2012 | Hotelling et al. | |
| 2012/0182238 A1 | 7/2012 | Lee | |
| 2012/0206246 A1 | 8/2012 | Cruz-Hernandez et al. | |
| 2012/0229264 A1 | 9/2012 | Bosch et al. | |
| 2012/0249462 A1 | 10/2012 | Flanagan et al. | |
| 2012/0319987 A1 | 12/2012 | Woo | |
| 2013/0038541 A1* | 2/2013 | Bakker | 345/173 |
| 2013/0076652 A1 | 3/2013 | Leung | |
| 2013/0093685 A1* | 4/2013 | Kalu | G06F 3/04886 345/173 |
| 2013/0154933 A1 | 6/2013 | Sheik-Nainar | |
| 2013/0179827 A1 | 7/2013 | Eriksson et al. | |
| 2013/0222267 A1 | 8/2013 | Almalki | |
| 2013/0222289 A1 | 8/2013 | Kwak | |
| 2013/0321290 A1 | 12/2013 | Oh | |
| 2014/0028575 A1 | 1/2014 | Parivar | |
| 2014/0062933 A1* | 3/2014 | Coulson | G06F 3/044 345/174 |
| 2014/0062934 A1* | 3/2014 | Coulson | G06F 3/044 345/174 |
| 2014/0145836 A1 | 5/2014 | Tossavanen et al. | |
| 2014/0176485 A1 | 6/2014 | Holmberg et al. | |
| 2014/0191973 A1 | 7/2014 | Zellers | |
| 2014/0197936 A1 | 7/2014 | Biggs et al. | |
| 2014/0198071 A1* | 7/2014 | Algreatly | G06F 3/0414 345/173 |
| 2014/0347289 A1 | 11/2014 | Suh | |
| 2015/0089435 A1 | 3/2015 | Kuzmin | |
| 2015/0109223 A1 | 4/2015 | Kessler et al. | |
| 2015/0116205 A1 | 4/2015 | Westerman et al. | |
| 2015/0130730 A1 | 5/2015 | Harley et al. | |
| 2015/0155474 A1 | 6/2015 | Tanimoto et al. | |
| 2015/0177899 A1 | 6/2015 | Degner et al. | |
| 2015/0192482 A1 | 7/2015 | Araki | |
| 2015/0227280 A1 | 8/2015 | Westerman et al. | |
| 2015/0234493 A1* | 8/2015 | Parivar | G06F 3/044 345/174 |
| 2015/0242037 A1 | 8/2015 | Pedder et al. | |
| 2015/0301642 A1 | 10/2015 | Hanaur | |
| 2015/0346881 A1 | 12/2015 | Watazu | |
| 2016/0085355 A1 | 3/2016 | Pirogov | |
| 2016/0091972 A1 | 3/2016 | Patel et al. | |
| 2016/0162030 A1 | 6/2016 | Patel et al. | |
| 2016/0162031 A1 | 6/2016 | Westerman et al. | |
| 2016/0188010 A1 | 6/2016 | Wright et al. | |

FOREIGN PATENT DOCUMENTS

| | | |
|---|---|---|
| CN | 101482785 | 7/2009 |
| CN | 101523329 | 9/2009 |
| CN | 101763193 A | 6/2010 |
| CN | 101833393 | 9/2010 |
| CN | 101868770 | 10/2010 |
| CN | 102047088 | 5/2011 |
| CN | 102084325 | 6/2011 |
| CN | 102084328 | 6/2011 |
| CN | 102144205 | 8/2011 |
| CN | 102339166 | 2/2012 |
| CN | 102426490 | 4/2012 |
| CN | 102640093 | 8/2012 |
| CN | 1496549 | 10/2012 |
| CN | 102713805 | 10/2012 |
| CN | 102870080 | 1/2013 |
| CN | 103097990 | 5/2013 |
| DE | 102010007486 | 8/2011 |
| EP | 2077490 | 7/2009 |
| EP | 2202619 | 6/2010 |
| EP | 2320309 | 5/2011 |
| EP | 2357547 | 8/2011 |
| EP | 2375306 | 10/2011 |
| EP | 2381340 | 10/2011 |
| EP | 2395414 | 12/2011 |
| EP | 2648071 | 10/2013 |
| JP | 2007034991 | 2/2007 |
| KR | 101274123 | 6/2013 |
| KR | 20130109288 | 10/2013 |
| TW | 201314541 | 4/2013 |
| WO | WO2012/161061 | 11/2012 |
| WO | WO 13/169299 | 11/2013 |
| WO | WO 13/169303 | 11/2013 |
| WO | WO 13/169305 | 11/2013 |
| WO | WO 14/017407 | 1/2014 |
| WO | WO 15/020663 | 2/2015 |

OTHER PUBLICATIONS

Zordan, Enrico et al., "Principle design and actuation of a dual chamber electromagnetic micropump with coaxial cantilever valves," Biomedical Microdevices, Kluwer Academic Publishers, BO, vol. 12, No. 1, Oct. 17, 2009, pp. 55-62.

Pava et al., "Real Time Platform Middleware for Transparent Prototyping of Haptic Applications," 2004.

Technifast, "Blind Captive Nuts," Jun. 30, 2013, http://www.technifast.co.uk.

International Search Report and Written Opinion, dated Feb. 12, 2014, PCT/US2013/052006, 15 pages.

International Search Report and Written Opinion, dated Apr. 24, 2014, PCT/US2014/013206, 12 pages.

Product Specification Sheet: GEEPLUS, VIBRO1 Vibration Actuator, 2 pages, www,geeplus.biz, downloaded on Jul. 15, 2015.

U.S. Appl. No. 15/791,618, filing date Oct. 24, 2017, Wells et al.

U.S. Appl. No. 15/797,992, filing date Oct. 30, 2017, Kessler et al.

* cited by examiner

GESTURE AND TOUCH INPUT DETECTION THROUGH FORCE SENSING

TECHNICAL FIELD

The present invention relates generally to computing devices, and more specifically, to detecting inputs for computing devices.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens can include a touch sensor panel, which may be a clear panel with a touch-sensitive surface, and a display device that can be positioned behind the panel so that the touch-sensitive surface substantially covers the viewable area of the display device. Touch screens allow a user to provide various types of input to the computing device by touching the touch sensor panel using a finger, stylus, or other object at a location dictated by a user interface being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. Each row can be driven by a stimulation signal, and touch locations can be identified through changes in the stimulation signal. Typically, a touch location is sensed based on an interference of the stimulation signal, such that a touch location may correspond to a location where the stimulation signal is the weakest. Touch sensor panels may generally be configured to detect touches from a user's fingers, which generally have a surface area that contacts the touch sensor panel to disturb the stimulation signal sufficiently for touch location to be recognized.

In some instances, computing devices incorporating touch screens may be configured to detect one or more gestures as user inputs. For example, a first type of finger movement, such as a user moving two fingers away from each other may indicate a first type of input (e.g., a zoom-in command), whereas a second type of finger movement, such as a user moving two fingers towards each other may indicate a second type of input (e.g., a zoom-out command). However, in some instances, if a user begins a gesture just outside of the touch screen sensing region, such as towards an edge of the device, the gesture may be difficult to detect because only a portion of the gesture may be detected by the touch screen. In these instances, computing devices may sense inputs that may be different from a user's intended input.

SUMMARY

One example of the present disclosure may take the form of a computing device configured detect a user input. The computing device includes a processor, a touch interface in communication with the processor and configured to detect a touch signal corresponding to an object approaching or contacting a surface, and at least three force sensors in communication with the processor and configured to detect a force signal corresponding to an object exerting a force on the surface. In response to the force the processor determines a force centroid location and the touch signals are processed by the processor by analyzing the force centroid location.

Another example of the disclosure may take the form of a method for detecting user inputs to a computing device through force sensing. The method includes detecting by three or more force sensors a force input, calculating by a processor in communication with the force sensors a force centroid based on the force input, and using the force centroid to analyze one or more user inputs to the computing device.

Yet another example of the disclosure may take the form of a mobile computer configured to detect at least two types of user inputs. The mobile computer includes a processor, a touch screen in communication with the processor, and at least three pressure sensors in communication with the processor. The touch screen is configured to detect a touch signal corresponding to a user finger approaching or contacting the touch screen. The at least three pressure sensors are configured to detect a pressure signal corresponding to an object proving pressure on a surface. In response to the pressure signal the processor determines a centroid location relative to the surface and the touch signal is processed by the processor by analyzing the centroid location.

SPECIFICATION

Overview

Figure 1:
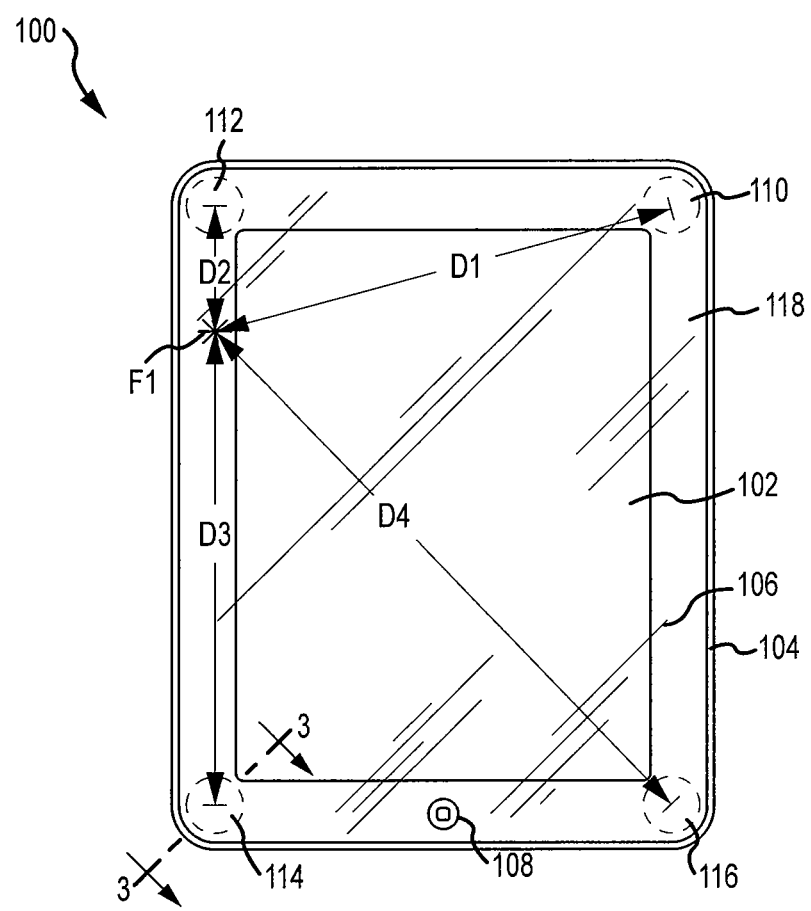
FIG. 1 is a top plan view of a computing device including a touch interface for detecting one or more touch inputs.

In some embodiments herein, a computing device including a touch interface for detecting one or more touch inputs and a plurality of force sensors for detecting one or more force inputs is disclosed. The computing device may include at least three, and typically four or more, force sensors that detect a force input on a surface. The force sensors may be distributed along different portions of the computing device, and generally may be operably connected to a cover surface. The cover surface may cover a portion if not all of the touch screen and/or an enclosure, such as a protective glass layer covering the touch screen or other portions of the computing device. The cover surface may extend over the touch screen, as well as other non-touch sensitive portions of the computing device. For example, in some instances the computing device may include a "black mask" portion or other enclosure area of the display that may border a portion, if not all, of the touch screen, but may not be sensitive to capacitive or touch inputs.

In some embodiments, the force sensors may be used to detect inputs on non-touch sensitive regions of the computing device. For example, if a user applies a force on the black mask, the force sensors may detect the input force and/or its location. Additionally, the force sensors may be used to enhance detection of inputs on the touch sensitive regions of the computing device. In these embodiments, the force sensors may enhance detection of input gestures that may begin on the non-touch sensitive surface, as well as may provide additional input receiving mechanisms which may allow the non-touch sensitive surfaces of the computing device to receive user inputs.

In some instances, when an input force is received, such as due to a user applying a force on the cover glass, the force sensors may each detect a force signal that may correspond to the input force, but the sensed signal may vary based on the location of each of the force sensors. For example, if the input force is exerted on a top right hand corner of the surface, a first force sensor adjacent the top right corner of the surface may sense a first force value, a second force sensor that may be in a left bottom corner may sense a second force value, and a third force sensor in a left top corner may sense a third value. These three force values may be used to determine a location of a center of the force or force centroid location.

The force centroid location may be used to analyze one or more touch inputs and/or user force inputs to the computing device. As a first example, the force centroid may be used in conjunction with any detected touch input to determine if a touch input is part of a force gesture that began off of the touch screen sensitive area, such that the touch input may be treated as a touch gesture. As a second example, the force centroid may be used to determine if one or more touch inputs are accidental, such as due to a user holding the computing device and placing a portion of a finger on the touch sensitive screen but not meaning to provide a touch input. As a third example, the force centroid may be used to detect user inputs outside of the touch sensitive area. In this example, the computing device may detect certain user inputs which may be correlated to virtual buttons or commands outside of the touch sensitive or active touch region.

DETAILED DESCRIPTION

Turning now to the figures, a computing device including a touch screen will now be discussed in more detail. FIG. 1 is a top perspective view of a computing device 100 including a touch interface 102 and force sensors 110, 112, 114, 116. The computing device 100 may be substantially any type of electronic device including a touch input mechanism, such as the touch interface 102 or other touch screen and associated components. For example, the computing device 100 may be a laptop computer, a tablet computer, a smart-phone, a digital music player, portable gaming station, or the like.

The computing device 100 may include the touch interface 102, an enclosure 104 at least partially surrounding the touch interface 102, a cover surface 106 covering at least a portion of the touch interface 102 and/or the enclosure 104, and/or one or more input buttons 108. The enclosure 104 encloses one or more components of the computing device 100, as well as may surround and/or secure a portion of the touch interface 102 to the computing device 100. The one or more input buttons 108 may provide input functions to the computing device 100. For example, the input buttons 108 may adjust a volume for the computing device 100, turn the computing device 100 on or off, or may provide other inputs for the computing device 100. Further, the computing device 100 may also include one or more receiving ports (not shown). The receiving ports may receive one or more plugs or connectors, such as but not limited to, a universal serial bus (USB) cable, a tip ring sleeve connector, or the like.

The cover surface 106 may be incorporated as a portion of the touch interface 102 and/or may be a protective surface that protects the touch interface 102 and/or enclosure 104 or portions thereof. In some embodiments, the cover surface 106 may extend over a top surface of the enclosure 104 as well as a top surface of the touch interface 102. In these embodiments, the cover surface 106 may also act as an enclosure for the components of the computing device 100. The cover surface 106 may be a material that may allow for one or more electrical properties to be transmitted therethrough. For example, the cover surface 106 may be a glass or plastic. Additionally, in instances where the touch interface 102 may also include a display screen, at least a portion of the cover surface 106 that extends over the touch interface 102 may be clear or partially transparent. Typically the cover surface 106 should be sufficiently thin to allow for sufficient electrode coupling between the touch interface 102 and any external input objects (e.g., fingers, input devices).

The touch interface 102 may include one or more touch sensors in order to detect one or more touch or capacitive inputs, such as due to a user placing his or her finger close to or on the cover surface 106 and/or touch interface 102. The touch interface 102 will be discussed in more detail below, but may generally be any type of interface configured to detect changes in capacitance or other electrical parameters that may be correlated to a user input.

The force sensors 110, 112, 114, 116 are configured to sense an input force, or a change in a sensed force, that may be applied to the cover surface 106, the enclosure 104, and/or touch interface 102. Although the force sensors are discussed herein as receiving an input force that is applied to the cover surface, it should be noted that the force sensors may be operably connected to a variety of different surfaces or elements within the computing device where a user may apply a force. Accordingly, the discussion of any particular embodiments for the force sensors is meant as illustrative only, and not meant as limiting.

With continued reference to FIG. 1, in one embodiment, the first force sensor 110 may be positioned in a top right corner of the computing device 100, the second force sensor 112 may be positioned in a top left corner of the computing device 100, the third force sensor 114 may be positioned in a bottom left corner, and the fourth force sensor 116 may be positioned in a bottom right corner of the computing device 100. The force sensors 110, 112, 114, 116 may be operably connected to the cover surface 106 and/or touch interface 102 and may detect one or more input forces exerted on either the touch interface 102 or the cover surface 106. In a specific example, the force sensors 106 may be strain gages that may produce a signal based on or otherwise corresponding to a bending force applied thereto. As another example, the force sensors may be capacitive sensors that may sense changes in capacitance as pressure is applied to the cover surface 106. As yet another example, the force sensors may include optical sensors. In this example, a small camera or other imaging capture device may capture images of a known pattern that may be included on the bottom of the cover surface 106 and/or touch interface. As pressure is applied to the cover surface 106, the pattern may be varied (e.g., certain points may move closer to each other or may deform outwards), and the camera may capture the pattern and any changes thereto. The pattern changes could be translated by the computing device into one or more scaled images that may translate into force measurements.

In some embodiments, such as shown in FIG. 1, the force sensors 110, 112, 114, 116 may be spaced apart from one another along the perimeter of the touch interface 102, such as in each corner of a rectangular shaped enclosure. However, in other embodiments, the force sensors 110, 112, 114, 116 may be positioned adjacent one another, within the touch interface 102, above or below the touch interface 102, or the like. Moreover, although only four force sensors are illustrated, the computing device 100 may include substantially any number of force sensors 102. That said, in many embodiments, the computing device 100 may include at least three force sensors 102 to better estimate the location of a force centroid, which will be discussed in more detail below. Additionally, the number and positioning of the force sensors may be varied based on changes in the shape, dimensions, or the like of the computing device.

Figure 2:
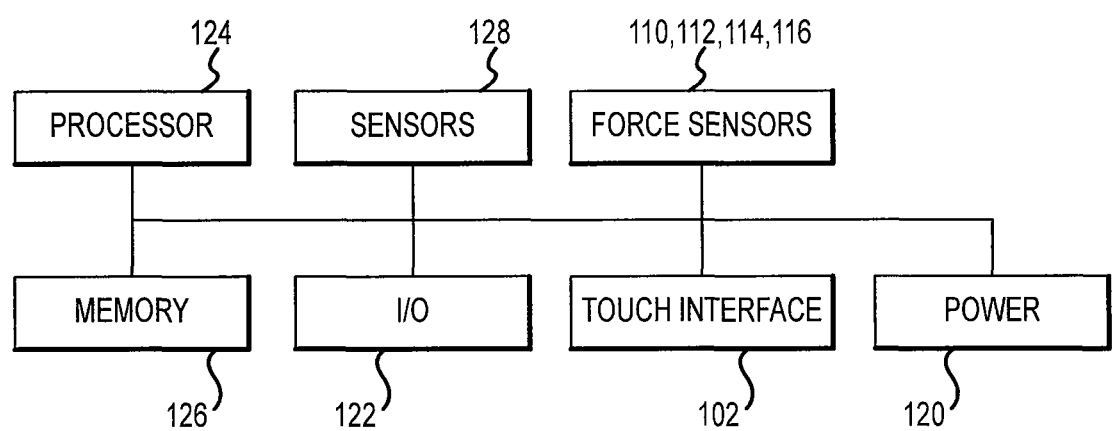
FIG. 2 is a simplified block diagram of the computing device of FIG. 1.

The computing device 100 may include one or more components that may be in communication with one another. FIG. 2 is a simplified block diagram of the computing device 100. With reference to FIG. 2, the computing device 100 may further include a power source 102, an input/output interface 122, a processor 124, one or more memory components 126, and/or one or more sensors 128.

The processor 124 may be substantially any electronic device cable of processing, receiving, and/or transmitting instructions. For example, the processor 124 may be a microprocessor or a microcomputer. As described herein, the term "processor" is meant to encompass a single processor or processing unit, multiple processors, or multiple processing units, or other suitably configured computing element. For example, select components of the electronic device 100 may be controlled by a first processor and other components of the electronic device 100 may be controlled by a second processor, where the first and second processors may or may not be in communication with each other. As a specific example, the touch interface 102 may include one or more separate processing components that may be in communication with the processor 124.

The memory 126 may store electronic data that may be utilized by the electronic device 100. For example, the memory 126 may store electrical data or content e.g., audio files, video files, document files, and so on, corresponding to various applications. The memory 126 may be, for example, non-volatile storage, a magnetic storage medium, optical storage medium, magneto-optical storage medium, read only memory, random access memory, erasable programmable memory, flash memory, or a combination of one or more types of memory components.

The electronic device 100 may also include one or more sensors 128, in addition to the force sensors 110, 112, 114, 116 and/or touch sensors incorporated into the touch interface 102. The sensors 128 may provide substantially any type of input to the electronic device 100. For example, the sensors 128 may be one or more accelerometers, gyroscopes, light sensors, image sensors (such as a camera), force sensors, and so on.

The power source 120 may be substantially any device capable of providing energy to the computing device 100. For example, the power source 120 may be a battery, a connection cable that may be configured to connect the computing device 100 to another power source such as a wall outlet, or the like.

The input/output interface 122 may be configured to provide communication to and from the computing device 100. For example, the input/output interface 122 may facilitate communication by the computing device to and from a variety of devices/sources. For example, the input/output interface 122 may receive data from user, control buttons on the computing device 100, and so on. Additionally, the input/output interface 122 may also receive/transmit data to and from an external drive, e.g., a universal serial bus (USB), or other video/audio/data inputs.

It should be noted that FIGS. 1 and 2 are exemplary only. In other examples, the electronic device may include fewer or more components than those shown in FIGS. 1 and 2. Additionally, the illustrated electronic device is only an example of a computing device incorporating the touch interface and force sensors.

Figure 3:
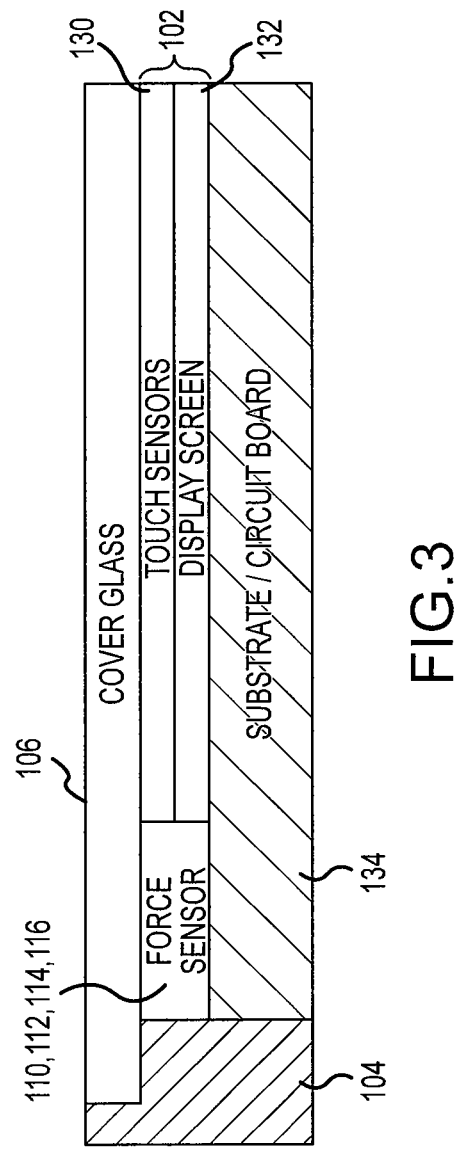
FIG. 3 is a simplified cross-section view of the computing device taken along line 3-3 in FIG. 1.

The touch interface 102 and force sensors 110, 112, 114, 116 will now be discussed in more detail. FIG. 3 is a cross-section view of the computing device 100 taken along line 3-3 in FIG. 1. With reference to FIG. 3, the cover surface 106 may extend over a top surface of the enclosure 104, as well as over the force sensors 110, 112, 114, 116, and the touch interface 102. The force sensors 110, 112, 114, 116 may be operably connected to the cover surface 106, the enclosure 104, as well may be in communication with the touch interface 102.

With reference to FIG. 3, the touch interface 102 and/or force sensors 110, 112, 114, 116 may be operably connected to and/or in communication with a substrate or circuit board 134. The substrate 134 may provide communication between the force sensors 110, 112, 114, 116 and/or touch interface 102 with one or more components for the computing device 100, such as but not limited to, the processor 124, the memory 126, and the power source 120.

The touch interface 102 is configured to receive inputs from an object (e.g., location information based on a user's finger or data from the input device) and to send this information to the processor 124. The touch interface 102 may report touches to the processor 124 and the processor interprets the touches in accordance with its programming. For example, the processor may initiate a task in accordance with a particular touch. The touch interface 102 may include a display screen 132 and a sensor panel 130 positioned at least partially over the display screen 132.

The display screen 132 is configured to display one or more output images and/or videos for the computing device 100. The display screen 132 may be substantially any type of display mechanism, such as a liquid crystal display (LCD), plasma display, or the like. In instances where the display screen 132 is a LCD display, the display screen 132 may include (not shown) various layers such a fluorescent panel, one or more polarizing filters, a layer of liquid crystal cells, a color filter, or the like. It should be noted that FIG. 3 is not drawn to scale and is a schematic view of the touch interface 102, for instance, there may be a gap (not shown) between on or more components of the touch interface and/or cover surface.

In some embodiments, the cover surface 106 may be a clear glass or plastic panel that may allow the display screen 132 to be viewable therethrough. The sensor panel 130 may include one or more electrodes which may be deposited on the cover surface 106. For example, the electrode layer may include transparent conductive materials and pattern techniques such as ITO and printing.

It should be noted that in some embodiments, the touch interface 102 be substantially any type of touch screen or touch detecting component(s). For example, the touch interface may not be see-through and/or may not correspond to a display screen. In these instances, a particular surface or group of surfaces may be configured to receive touch inputs, that may or may not correspond to a separately displayed user interface, icons, or the like.

The sensor panel 130 may include one or more touch sensors that may detect changes in an electrical parameter that may correspond to an object touch or approaching the touch interface 102. For example, the sensor panel 130 may include one or two layers of electrodes which may be spaced apart across the panel 130. The electrodes may define one or more nodes that act as capacitive coupling sensors to detect touches on the touch interface 102. The number and configuration of the nodes may be varied, depending on the desired sensitivity of the touch interface 102.

In some embodiments, the sensor panel 130 of the touch interface 102 may be configured to detect touches on the surface of the touch interface 102 by sensing one or more changes in capacitance. Typically when two electrically conductive members come close to one another, without actually touching, their electric fields interact to form a capacitance. As briefly described above, the sensor panel 130 may include a plurality of sensing nodes that may be formed by one or more electrodes that may interact with an external object, such as a user's finger, to detect the presence of the object.

The touch interface 102 can detect changes in capacitance at each node, which may allow the touch interface 102 to determine when and where a user has touched various surfaces of the cover surface 106 and/or touch interface 102 with one or more objects. The touch interface 102 may be substantially any type of touch detecting mechanism as generally known in the art, and the specific implementations may be based on a number of different factors, such as but not limited to, the size of the touch screen, the desired sensitivity of the touch screen, and so on. Accordingly, the discussion of the any particular touch interface configuration is meant as illustrative only and not limiting.

With reference again to FIG. 3, the force sensors 110, 112, 114, 116 may be operably connected to the cover surface 106 in order to detect input forces that may be applied at substantially any location of the cover surface 106. For example, the force sensors 110, 112, 114, 116 may measure force by sensing a deflection of the cover surface 106. However, in other embodiments, the force sensors 110, 112, 114, 116 may be other mechanisms configured to sense a change in one or more parameters that may be correlated to a change in force.

The touch interface 102 and the force sensors 110, 112, 114, 116 may be used to determine the location and strength of various inputs to the cover surface 106 of the computing device 100. The computing device 100, using the force sensors 110, 112, 114, 116 positioned at each corner of cover surface 106, may be configured to determine the location of a force centroid for a user input or inputs. The force sensors may be differently configured and/or positioned in other embodiments, but may still be used to determine and assign forces to particular input locations.

Centroid Calculations with a Detected Touch Position

For user inputs that are in communication with the touch interface 102 (e.g., detectable by the touch interface, such as being within an active touch region), the touch sensors 130 may determine the location of any touches or inputs to cover surface 106 positioned over the touch interface 102, and the force sensors 110, 112, 114, 116 may determine the force magnitude at locations of the cover surface 106.

For example, in instances where the user provides an input force to the cover surface 106 above the touch interface 102 with a single finger, the computing device 100 may associate that position with the entire force detected by the one or more force sensors 110, 112, 114, 116. However, in many instances the user may provide an input force or forces with one or more fingers and/or other portions of his or her hand. For example, the touch interface 102 may be used to capture input gestures based on the number or type of finger inputs. In these instances, the computing device 100 may determine an input force associated with several or all of the various touch locations on the cover surface 106 to input force levels. In some embodiments, the computing device 100 may determine a centroid of the overall applied force, which may include a location of approximately a center of the applied forces. In this manner, if there is a force applied by two fingers of a user, the centroid may be positioned between the two fingers.

Examples of centroid calculations to determine the force centroid location will be discussed in more detail below. As briefly discussed above, in instances where the input force may be applied to the touch interface 102, the position of the force may be determined based on the touch location data sensed by the touch interface 102. In these embodiments, the computing device 100 may determine the touch location providing a majority of the input force using a centroid calculation. However, because in some embodiments the computing device 100 may include only a four force sensors 110, 112, 114, 116, some calculations and/or estimations may be used to determine the finger that may be providing the input force. As described in more detail below, the computing device 100 may utilize the position information as detected by touch interface 102 along with various force signals detected by the four force sensors 110, 112, 114, 116 to determine the touch location corresponding to a particular force. By determining the centroid of the input forces provided to the cover surface 106, and due to the position of touches on the cover surface 106 detected by the sensor panel 130 of the touch screen 106, the computing device 100 may determine the finger providing the input force as the finger closest to the force centroid. The global force centroid $C_{GF}$ may be expressed by Eq. (1) below:

$$C_{GF} = \frac{\sum W_i P_i}{\sum W_i} \qquad \text{Eq. (1)}$$

In Eq. (1), the global force centroid $C_{GF}$ is expressed as the sum of a select number of positions $P_i$ multiplied times the weight $W_i$ at each position $P_i$, divided by the sum of the weights $W_i$. The positions $P_i$ may be determined by the touch interface 102. For example, if the user presses on the cover surface 106 with two fingers, those fingers may provide a position input signal (such as a change in capacitance) at two separate locations or nodes. Those locations may be used as two input positions $P_i$ in Eq. (1). In some instances, the positions $P_i$ may be a set or coordinates or a single axis coordinates, in the latter example, Eq. (1) may be repeated twice, once for a X or horizontal axis and once for a Y or vertical axis. In other examples, such as illustrated in Eq. (2), the positions $P_i$ may be represented as position vectors relative to a predetermined origin. The weight $W_i$ may be same as the force sensed by each force sensor, or may be the force sensed by each force sensor multiplied by gravitational acceleration (e.g., 9,80665 m/s² or 32.174 ft/s²).

Eq. (1) also uses the weight Wi for each position; however, because there may not be force sensors 110, 112, 114, 116 at every location of the cover surface 106 where there may be a touch, the weight Wi at each position may not be known, only the force at the location of the force sensors 110, 112, 114, 116. In these embodiments, the position information along with the force sensed at each input sensor 110, 112, 114, 116 may be used to solve for a global force centroid.

Using the example of a computing device 100 having four force sensors 110, 112, 114, 116, Eq. (1) may be expanded to include the values for each of the input sensors 110, 112, 114, 116 extrapolated to Eq. (2) below:

$$\vec{C}_{GF} = \frac{LPF(C_{BL}^{F[n]})x\vec{C}_{BL}^{position} + LPF(C_{TL}^{F[n]})x\vec{C}_{TL}^{position} + LPF(C_{RL}^{F[n]})x\vec{C}_{RL}^{position} + LPF(C_{RB}^{F[n]})x\vec{C}_{RB}^{position}}{LPF(C_{RL}^{F[n]}) + LPF(C_{TL}^{F[n]}) + LPF(C_{RL}^{F[n]}) + LPF(C_{RB}^{F[n]})} \quad \text{Eq. (2)}$$

In Eq. (2) above and with reference to FIG. 1, LPF represents the low pass filter, $C_{RB}^{F[n]}$ is the force registered by the right bottom (RB) force sensor 116, $\vec{C}_{BL}^{position}$ is the position vector from respective sensor to the touch position, $C_{TL}^{F[n]}$ represents the force registered by the top left force sensor 110, $\vec{C}_{TL}^{position}$ is the position vector from respective sensor to the touch position, $C_{RL}^{F[n]}$ is the force registered by the right top force sensor 112, $\vec{C}_{RL}^{position}$ is the position vector from respective sensor to the touch position, $C_{RB}^{F[n]}$ is the force registered by the right bottom force sensor 114, $\vec{C}_{RB}^{position}$ is the position vector from respective sensor to the touch position, which may represent the location and value of particular force relative to a particular predetermined origin.

As indicated in Eq. (2) in some embodiments, the values for the force sensors may be low pass filtered prior to processing. This filtering may be used to remove noise, such as spikes within the signal. However, in other instances, the input values from the force sensors 110, 112, 114, 116 may not need to be low pass filtered based on the noise level for each of the signals. As described above, the force sensors 110, 112, 114, 116 may be configured to detect a force at a predetermined location. However, in instances where there may be one or more forces applied to the cover surface 106, the force registered at each force sensor 110, 112, 114, 116 may be reduced or increased as compared to other sensors 110, 112, 114, 116 based on the distance of the applied force from the respective force sensor 110, 112, 114, 116. In other words, a moment of the cover surface 106 for a particular force sensor 110, 112, 114, 116 may vary based on distance from the particular force as a moment arm or perpendicular distance from the force location to the force sensor 110, 112, 114, 116 may increase or decrease. In some embodiments, the force sensors 110, 112, 114, 116 may be strain gages, which may register varying force inputs based on the moment, so that the force inputs as sensed by the force sensors 110, 112, 114, 116 may vary based on the distance to a respective input force.

Although the above examples were described with respect to four force sensors 110, 112, 114, 116, in other embodiments, three sensors or more than four sensors may also be used. For example, because only three points are required to define a plane, the computing device 100 may include only three force sensors and use substantially the same calculations as above. Alternatively, the computing device 100 may include more force sensors in order to refine the above calculations.

Using Eq. (2) above, the global force centroid, that is the location of the center of the applied force, may be determined. As an example, with a single touch, the center of the force may be determined by analyzing the force registered at each force sensor, along with the location of the touch detected by the touch interface 102. Because in this example, there is only a single input touch, the computing device 100 may determine that the entire force was provided at the location of the force centroid, and then use that knowledge to determine the force magnitude applied thereto.

Centroid Calculations without a Detected Touch Position

For user inputs that are not in communication with the touch interface 102, such as those that are in the black mask 118 portion of the cover surface 106 that is not above the touch interface 102, or otherwise outside of the touch sensitive region of the touch screen, the force sensors 110, 112, 116, 118 may detect the force magnitude and may extrapolate position from the varying values detected by each sensor 110, 112, 114, 116. For example, with reference to FIG. 1, assuming that a first force F1 is applied to a portion of the cover surface 106 outside of the touch sensitive region, each of the sensors 110, 112, 114, 116 may sense a different force value (although the total applied input force may be constant) that may correspond to the distance that each force sensor 110, 112, 114, 116 is positioned from the input force F1. As shown in FIG. 1, the first force sensor 110 may be spaced a distance of D1 from the input force F1, the second force sensor 112 may be spaced a distance of D2 from the input force F1, the third force sensor 114 may be spaced a distance of D3 from the input force F1, and the fourth force sensor 116 may be spaced a distance of D4 from the input force F1.

In the example illustrated in FIG. 1, the input force F1 is shown closest to the second sensor 112, and thus the second force sensor 112 may sense the largest magnitude force. Similarly, the third force sensor 114 may sense the second largest magnitude force, and so on. In this example, the differences in sensed force magnitude may correspond to the difference in distance that each of the force sensors 110, 112, 114, 116 are positioned from the input force F1. Because the distance from which each of the sensors 110, 112, 1146, 116 are positioned from each other is known, this known distance may be used along with the varying sensed magnitudes to determine the approximate location of the input force F1.

As a specific, non-limiting example, the centroid location may be determined by determining the location of an axis centroid along a first axis and a second axis. The axis centroid values may then represent a coordinate for the overall centroid location. In this example, the computing device may use force values as measured by each of the sensors 110, 112, 114, 116 on a given axis of the device 100 (e.g., x or y axis). In some instances the device may include an axis centroid value for each side of the device, e.g., a left y axis, a right y axis, a top x axis, and/or a bottom x axis. Each value for a particular axis may be summed, and then value as detected by each respective sensor (that is, the force sensed by each sensor) may be multiplied by that axis length, providing a location of the axis centroid with respect to the particular axis. Specifically, if the second sensor 112 senses a force of 80 grams and the fourth sensor 114 senses a force of 20 grams, the total force for the left y axis may be 100 grams. In instances where the distance between the second sensor 112 and the fourth sensor 114 is 160 mm, than the force centroid for this example on the left edge y axis may be (80 g/100 g)*160 mm, such that the centroid for this axis is 128 mm from the fourth sensor 114 and 32 mm away from the second sensor 112. However, it should be noted that the above example is only one manner in which the force centroid may be determined, and other embodiments are envisioned. Moreover, the calculations for a force centroid may be varied based on the number and/or position of the sensors.

Using the Force Centroid Location

Figure 4A:
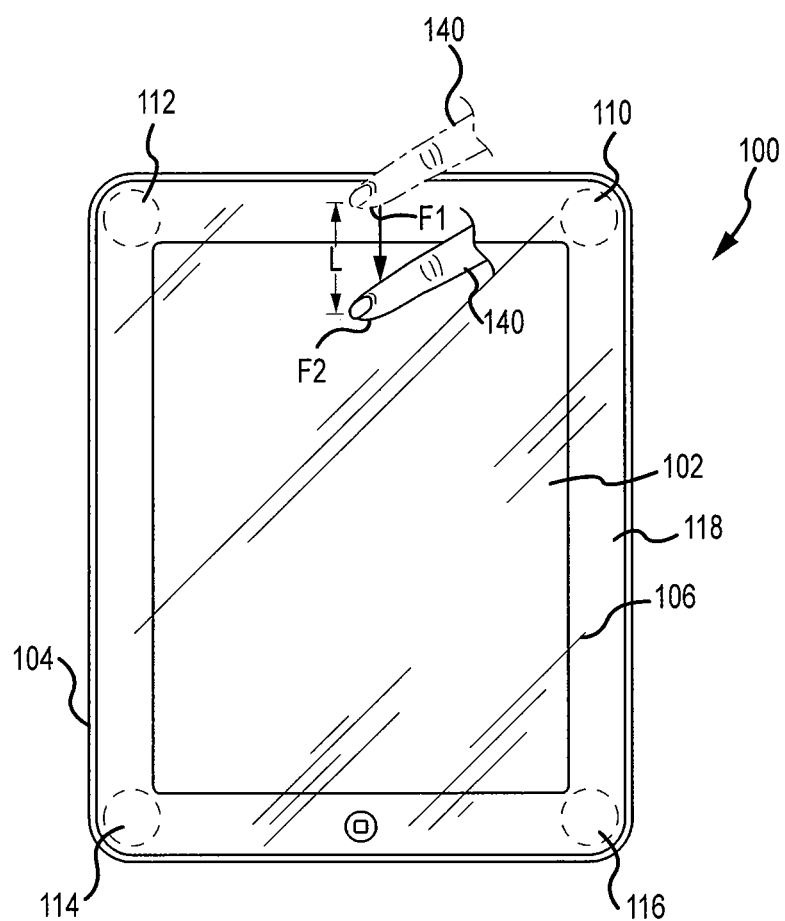
FIG. 4A is a top plan view of a user providing an input gesture to the computing device.

Using the equations listed above, the location of the global force centroid $C_{GF}$ can be determined for both instances where a touch may be detected by the touch interface 102, as well as instances where a touch may not be detected by the touch interface 102. The computing device 100 may then use the location of the $C_{GF}$ to track changes in applied force in order to better detect gestures that may begin in the black mask 118. FIG. 4A is a top plan view of a user's finger 140 providing a first force F1, the moving across the cover surface 106 to provide a second force F2. It should be noted that the two forces F1 and F2 may be a substantially continuous force applied along a length L1 of the movement of the finger 140, but may indicate the beginning and the end of a user input, such as a gesture.

Figure 4B:
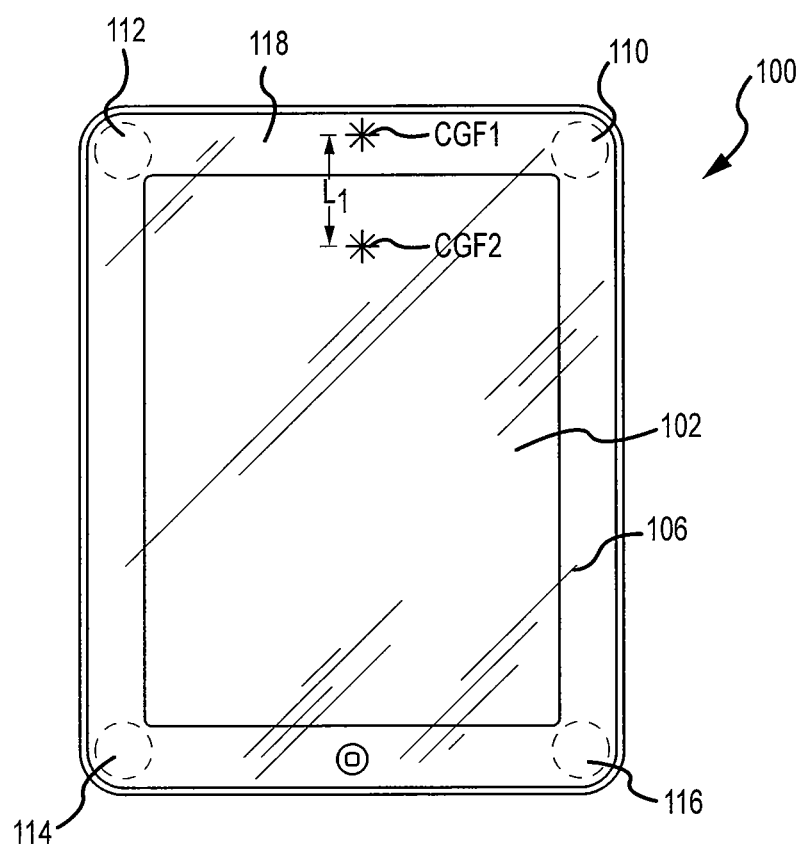
FIG. 4B is a top plan view of a first force centroid and a second force centroid corresponding to the input gesture of FIG. 4A.

After the user has input the finger gesture, by moving his or her finger 140 from the black mask 118 towards the touch interface 102, the location of the force centroid may also move. FIG. 4B is a top plan view of the computing device 100 of FIG. 4A illustrating a first force centroid $C_{GF1}$ and a second force centroid $C_{GF2}$ corresponding to the first force F1 and the second force F2, respectively. The two force centroid $C_{GF1}$ and $C_{GF2}$ may be determined using the equations above, and as the finger moves 140, and the force location moves, the global force centroid (that is, the center of the applied forces) may correspondingly move. In this manner the computing device 100 may be able to determine that the finger 140 moved from the black mask 118 towards the touch interface 102, although the touch interface 102 may not detect a first touch corresponding to the first force, but only a second touch corresponding to the second force F2. In this example, when the touch interface 102 finally detects the touch the processor may be able to determine whether a corresponding force centroid originated in the black mask 118 (or other portion outside of the touch interface 102) and is now at or close to the second finger. That is, whether the force centroid moved a distance of L1 that may be correlated to a distance from the second touch position to the black mask 118.

In the example illustrated in FIGS. 4A and 4B, the force sensors 110, 112, 114, 116 may sense different values for approximately the same level of force based on the distance between the force and a particular force sensor. In other words, for the first force F1, the force sensors 110, 112 positioned at the top of the cover surface 106 may sense a larger force magnitude as compared to the bottom force sensors 114, 116. In this manner, the processor may use the above provided equations to estimate the force centroid by approximating the location of the touch or by correlating the position of the force based on the different magnitudes detected at each force sensor 110, 112, 114, 116. An estimate of the location of the force centroid may be sufficient to determine if a user provide input is a gesture and/or whether it began in the black mask 118 because more detailed inputs of the gesture may be detected by the touch interface 102 once they extend across the black mask 118.

Figure 4C:
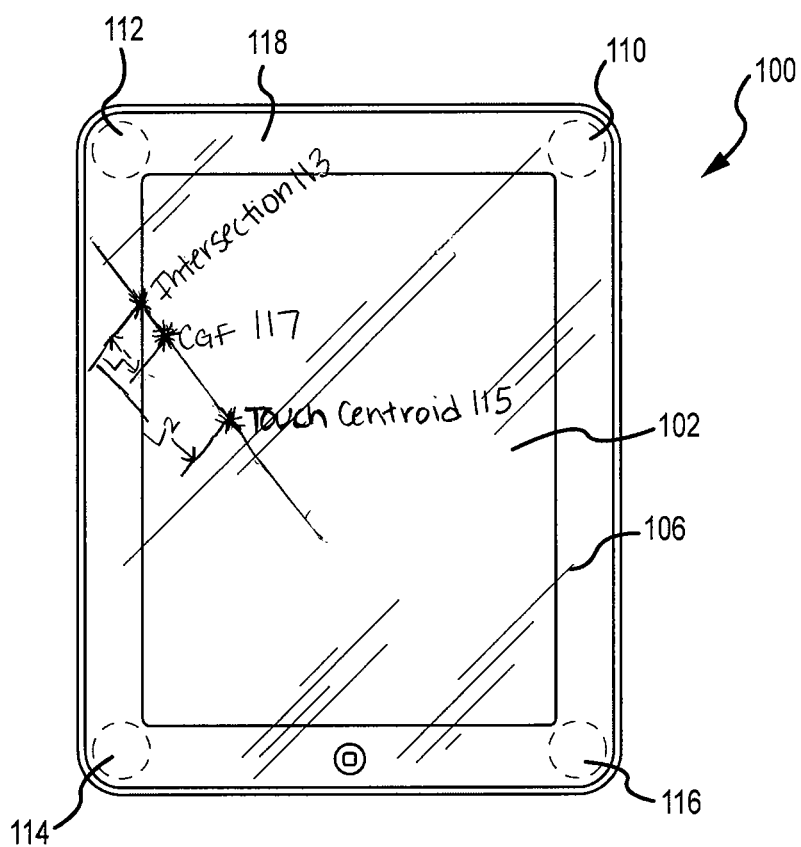
FIG. 4C is a top plan view illustrating a force centroid location and a touch centroid location based on one or more user inputs.

In some embodiments, the computing device 100 may determine or estimate a force applied to the black mask or non-touch sensitive portion of the cover surface. FIG. 4C is a top plan view illustrating a touch location centroid and force centroid. With reference to FIG. 4C, the processor may analyze the force centroid in light of a touch centroid location to determine what percentage of the total force sensed by the force sensors 110, 112, 114, 116 may be attributed to touches on the touch interface 102 as opposed to touches on the black mask 118. The touch location centroid 115 may be the centroid of one or more touches as sensed by the touch interfaces. In other words, if there is a single touch on the touch interface, the touch centroid will be positioned at that touch location, and if there is more than one touch, the touch centroid may be positioned at the centroid between the touches. The force centroid 117, as discussed in more detail above, may be positioned at the centroid of the sensed forces applied to the cover surface. The force allocation between the touch interface 102 and the black mask 118 may be used to provide inputs to the device 100, as well as help to evaluate touches as discussed in more detail below.

With reference to FIG. 4C, in instances where the force centroid $C_{GF}$ 117 does not match a computed touch location centroid 115, the processor may determine that the discrepancy may be due to the fact that a touch was applied in the black mask 118 region. Such a touch likely would not be detected by the touch interface 102, as it falls outside the touch sensitive region. In other words, if a user provides a force in the black mask, the force sensors may detect the applied force, but the touch interface may not detect the touch location, and thus the touch location would not be incorporated into the touch location centroid. Accordingly, in these instances, the force centroid may be a first position and the touch location centroid 115 may be at a second location, spaced apart from the force centroid 117 location.

Using these assumptions, the device 100 may determine the intensity of a force applied in the black mask 118. Specifically, the location difference between the touch centroid and the force centroid may be used to determine (or at least estimate) the location and intensity of a force applied in the black mask 118 region. For example, the computing device 100 may take into account the known location of the black mask 118, shown in FIG. 4C as being a rectangle surrounding the touch interface 102. In this example, a line extending from the touch centroid location, through the force centroid, and through the black mask 118 boundary region may be determined. That is, the two centroids may be connected through a line extending between the two, and the line may extend towards the black mask 118 bordering the touch sensitive region.

The intersection point 113 of the line as it enters the black mask region 118 may be used as a likely indicator of the location of the force input on the black mask 118. This may allow the computing device 100 to determine the side of the black mask 118 where the force was applied, as well as a general estimate of the actual location relative to that side of the black mask. Once the intersection 113 location is known, the ratio of the distance between the force centroid and the touch centroid to that location may be used to estimate the percentage of force applied in the touch region versus the black mask region. For instance, the force centroid may be located at a distance L2 from the intersection point and the touch location centroid may be located at a distance L1 from the intersection point. The percentage of the total sensed force that may be attributed to the black mask 118 region may be determined to be equal to one minus the ratio of the distance L2 over the distance L1. Expressed as an equation $$BlackMaskForce\ \% = \left(1 - \frac{L2}{L1}\right) \times 100.$$

The remaining percentage of the sensed force may then be attributed to the touch interface touch locations. In this manner, the percentage of the total force applied to the cover surface 106 that was applied in the black mask region 118, as well as the percentage applied in the touch interface 102 region may be determined.

Figure 5A:
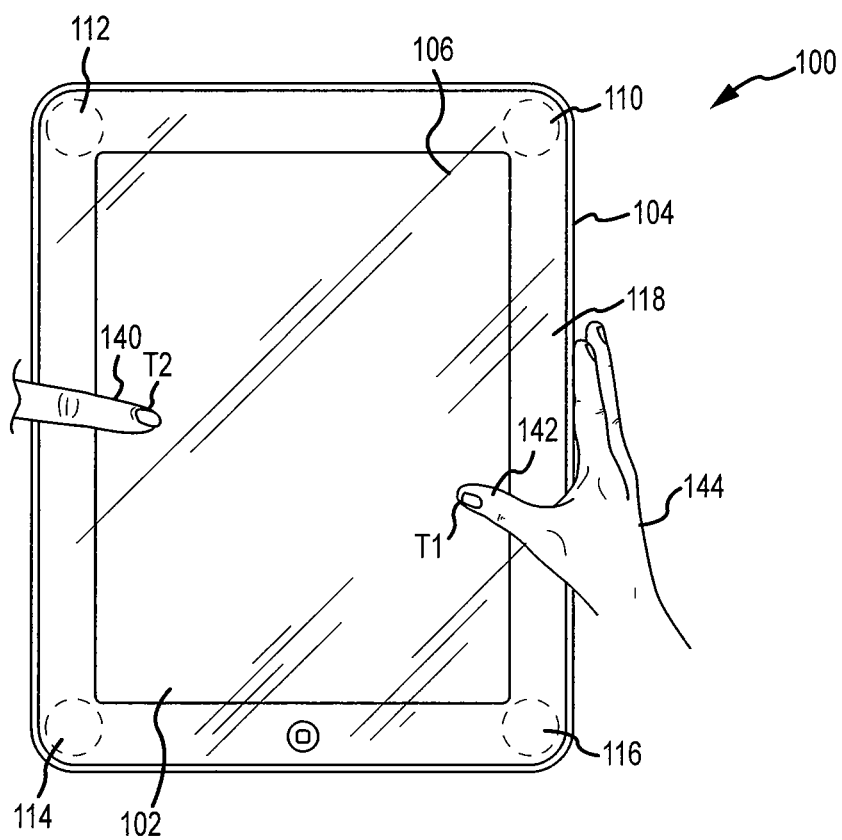
FIG. 5A is a top perspective view of the computing device of FIG. 1 being grasped by a user.
Figure 5B:
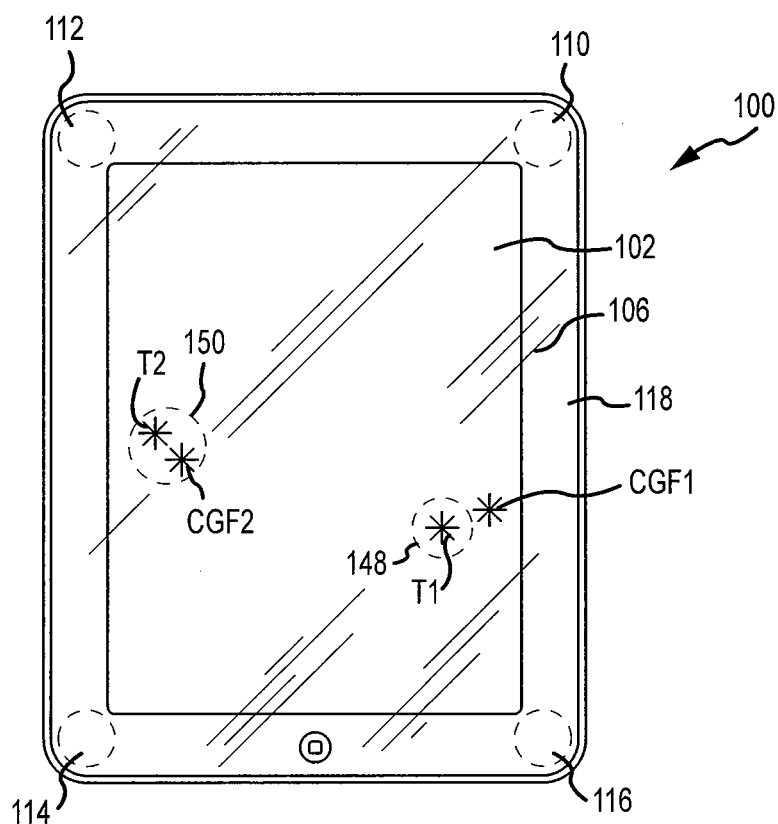
FIG. 5B is a top plan view illustrating the force centroid locations based on one or more user inputs.

The force sensors 110, 112, 114, 116 may also be used to determine whether a user force should be rejected or ignored. In other words, whether a user input on the touch interface 102 may be accidental. FIG. 5A is a top perspective view of a user holding the computing device 100 with one hand 144 and applying a force with a finger 140 from a second hand. FIG. 5B illustrates the force centroid location due to a touch by a thumb 142. With reference to FIGS. 5A and 5B, in some embodiments, users may hold the computing device 100 with one hand 144 while using the second hand to provide touch inputs to the touch interface 102. In some instances, one or more fingers of the first hand 144, such as the thumb 142 illustrated in FIG. 5A, may extend across the black mask 118 onto the touch interface 102. The placement of the thumb 142 (or other finger) may cause the touch interface 102 to detect a user touch input, although the user may have inadvertently placed the thumb 142 on the touch interface 102. In other words, although the user may have touched the thumb 142 on the touch interface 102, he or she may not have wished to provide a touch input to the device 100.

With reference to FIG. 5A, the thumb 142 may input a first touch T1 and if the user also uses his or her finger 140 from the second hand, that may be a second touch input T2. As a first example, in instances where the user may only touch the touch interface 102 with the thumb 142, the force sensors 110, 112, 114, 116 may detect a force corresponding only to the first touch T1, as well as any additional forces exerted on the black mask 118 due to the other portions of the hand 144. In this example, the force centroid $C_{GF1}$ may be located on the black mask 118 or adjacent to the black mask 118 on the touch interface 102. In other words, because the hand 144 may also apply some force to the cover surface 106 (as it grips the device 100), the force centroid may be positioned at a location between the first touch T1 of the thumb 142 and the position of the hand 144. In this example, the processor may determine that the first touch T1 is inadvertent, as the force centroid is not located at the touch position T1, but closer towards or on the black mask 118 portion of the cover surface 106. Thus, using the location of the centroid $C_{GF1}$ the processor may determine that the touch T1 is inadvertent, as most of the force is centered away from the touch towards or on the black mask 118.

In one embodiment, with reference to FIG. 5B, the computing device 100 may set a boundary 148 around the touch T1 and if the force centroid $C_{GF1}$ is not within the boundary 148, the touch T1 may be rejected and not processed as an input. In these embodiments, the boundary 148 may be set to be wider for touches closer towards a center of the touch interface 102 and may be smaller for touches closer to the black mask 118 or the edge of the touch interface 102. This may provide a greater sensitivity of the device 100 to reject touch inputs that may be accidental.

As a second example, with reference again to FIGS. 5A and 5B, in some instances, the user may provide a second touch T2 with the finger 140 from a second hand. In this example, in instances where the second touch T2 may be purposeful, the force centroid may move towards the second touch as the user may apply a stronger force than the resting force of the thumb 142. Specifically, $C_{GF2}$ may represent the location of the second force centroid that may correspond to the average center of the forces applied by the finger 140 and the thumb 142. In this case, because the second force centroid $C_{GF2}$ may be located approximately adjacent the second touch T2 within the second boundary 150 and outside of the boundary 148 around the first touch T1, the first touch T1 may be rejected.

It should be noted that in some instances a user may provide a purposeful input with both the finger 140 and the thumb 142 (or a second finger). In these instances, the force centroid may be positioned outside of the two boundaries 148, 150 and thus the processor 124 may interpret both touches as purposeful. This is because the total magnitude of the input forces may be relatively evenly distributed between both the finger 140 and the thumb 142 which may indicate that the user was applying a relatively equal force by both the finger 140 and thumb 142, and thus meant to provide an input to the touch interface 102 with both.

Figure 6:
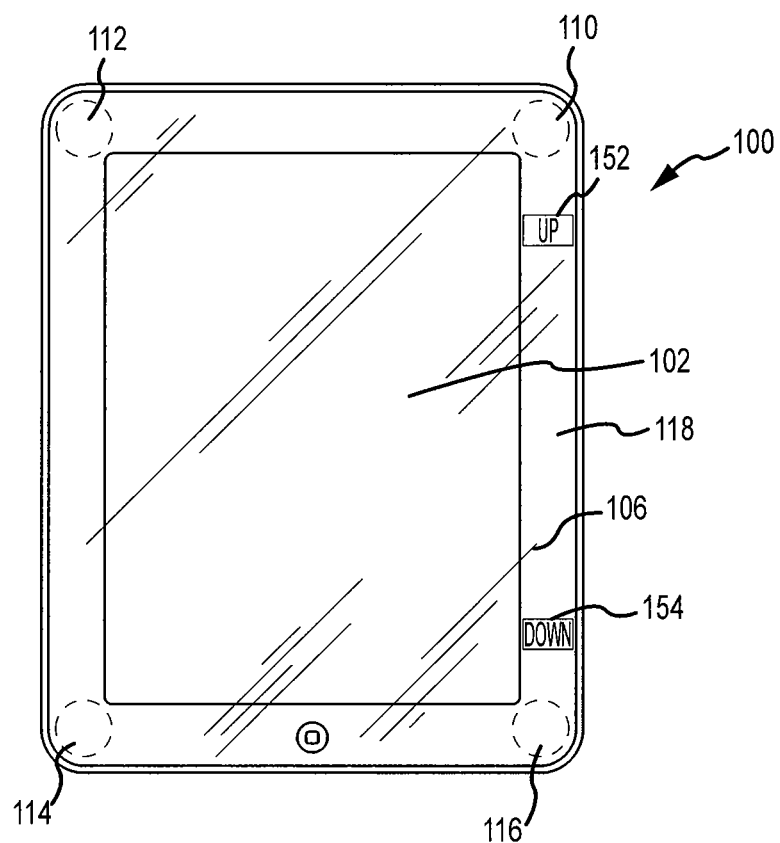
FIG. 6 is a top plan view of the computing device of FIG. 1 having user input buttons positioned on a non-capacitive touch sensitive surface.

In some instances, the computing device 100 may include one or more buttons within the black mask 118 or other non-touch sensitive portions of the cover surface 106. FIG. 6 is a top plan view of the computing device 100 including two buttons 152, 154 positioned on the black mask 118 outside of the touch sensitive region. In this example, a first button 152 may correspond to a first command and a second button 154 may correspond to a second command. For example, the first button 152 may correspond to a next page command and the second button 154 may correspond to a previous page command. The buttons may be differently configured based on the computing device 100 and/or applications operating on the computing device 100.

In the embodiment illustrated in FIG. 6 the buttons may be virtual in that they may not include a mechanical switch, but may be selected based on the location of the force centroid. In other words, a specific button 152, 154 may be determined to be selected by a user if the force centroid is closer towards a particular button.

Similarly, the computing device 100 may use the force sensors 110, 112, 114, 116 to detect taps on the black mask 118. The taps, such as a user pressing on the black mask 118 with his or her finger, may be used as an input to the computing device 100. For example, a first tap may represent a first command, whereas two taps successively may represent a second command. Additionally, the computing device 100 may detect gestures by a user outside of the touch sensitive region. For example, as a user slides his or her finger along a portion of the black mask 118 the force centroid may move correspondingly, and this motion may be sensed by the force sensors 110, 112, 114, 116 and tracked as a change in the location of the force centroid, and provided as a particular input. In this example, the sliding gesture may be used to switch pages on a reading application, adjust a volume, adjust brightness, and so on. Additionally, in these embodiments, these type of gestures may be distinguished from gestures that ultimately terminate in the touch sensitive region, as these type of gestures may not be correlated to any touch inputs. That is, gestures in the non-touch region, such as the black mask 118, may not include a corresponding touch input on the touch interface 102.

Figure 7:
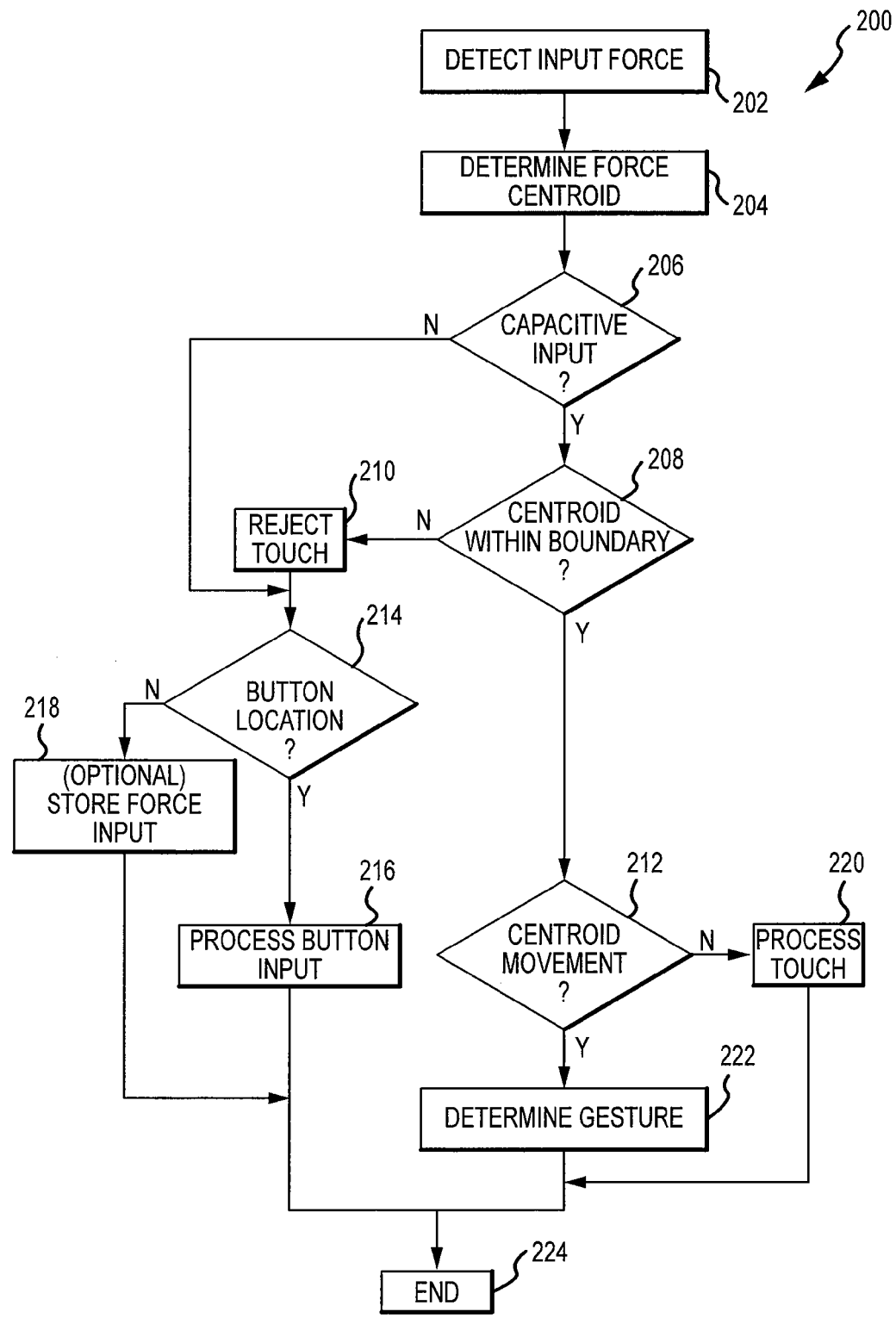
FIG. 7 is a flow chart illustrating a method for detecting user inputs and touch gestures using force sensors.

A method for using the force sensors 110, 112, 114, 116 to detect one or more force inputs to the computing device 100 will now be discussed. FIG. 7 is a flow chart illustrating an method 200 for using the force sensors of the computing device 100. The method 200 may begin with operation 202 and the force sensors 110, 112, 114, 116 may detect an input force. For example, as the user presses against the cover surface 106, an input force may be detected by the force sensors 110, 112, 114, 116.

Once the input force is detected, the method may proceed to operation 204 and the processor 124 may determine the location of the force centroid for the applied force of forces. In some embodiments, the sensed inputs for each of the force sensors 110, 112, 114, 116 may be used to determine the force centroid location. In instances where the input force may be applied to a touch sensitive region, the position of the input forces may be determined by the touch interface 102, and using the position information and force information the force centroid may be determined. However, for input forces not on the touch sensitive region, the sensed magnitudes by each of the force sensors 110, 112, 114, 116 may be used to determine the location of the force centroid.

As, during, or after the force centroid is determined, the method 200 may proceed to operation 206 and the computing device 100 may determine whether there was also a capacitive input. In other words, the computing device 100 may determine whether there was a touch input sensed in addition to the force input. In some embodiments, the touch determination may be done simultaneously with operation 204, as the touch information may be used (in some instances) to determine the force centroid location. In instances where the force input may be provided on the black mask 118, or another area outside of the sensitive region of the touch interface 102, the computing device 100 may determine that there is no capacitive input. On the contrary, if the user has provided an input to the touch sensitive area of the device 100, such as on the touch interface 102, the computing device 100 may detect a capacitive input (such as a change in capacitance due to a user's finger interacting with the touch sensors 130).

If a capacitive input is not detected, the method 200 may proceed to operation 214, which will be discussed in more detail. If a capacitive input is detected, the method 200 may proceed to operation 208 and the computing device 100, specifically the processor 124, may determine whether the centroid is within the boundary. For example, with reference to FIG. 5B, the boundaries 148, 150 may surround each of the touches and may extend around the touch location a predetermined distance.

If the centroid is not within the boundary, the method 200 may proceed to operation 210. As discussed above with respect to FIGS. 5A and 5B, when the centroid is outside of the touch boundary 148, 150, the method 200 may proceed to operation 210 and the touch input may be rejected. For example, as shown in FIGS. 5A and 5B, the touch may be due to the thumb 142 and thus may be determined to be inadvertent if it is outside the boundary surrounding the touch. If the centroid is within the boundary, the method 200 may proceed to operation 208, which will be discussed in more detail below.

With continued reference to FIG. 7, after operation 210 and the capacitive touch is rejected or otherwise not processed, the method 200 may proceed to operation 214. In operation 214, the processor 124 may determine whether the centroid location corresponds to a button location and/or whether the movement corresponds to a command, such as a gesture. For example, with reference to FIG. 6, the computing device 100 may include a number of buttons within the black mask 118 which may be determined to be selected with the force centroid has a location approximately equal to the location of the button or other predefined area.

If the centroid location does not correspond to a button location or a gesture, the method 200 may proceed to optional operation 218. In operation 218, the computing device 100 may store the force input information, such as the centroid location in one or more of the memory components. In these embodiments, the stored information may be used at a later time, such as if there is a subsequent touch in the touch interface 120 region that may have begun with an input force in the black mask 118. However, in other embodiments, the force information may not be stored.

However, if the centroid location corresponds to a button or gesture, the method 200 may proceed to operation 216 and the processor 124 may process the button or gesture. This may include providing the input to an application running, or otherwise utilizing the force inputs. After operations 216 and 218, the method 200 may proceed to an end state 224.

As briefly discussed above, in operation 208 if the centroid is within the boundary, the method 200 may proceed to operation 212. In operation 212 the computing device 100 may determine whether the centroid has moved. For example, in instances where a user may be performing a touch gesture, the centroid may have moved from the black mask 118 to the touch interface 102 region as the user completed the gesture. Centroid movement may be determined by analyzing one or more previous centroid locations based on one or more previous force inputs.

If the centroid has moved, the method 2000 may proceed to operation 222. In operation 222 the processor 124 may analyze the touch inputs detected by the touch interface 102 through the touch sensors 130, as well as the centroid and force inputs to determine the gesture, and thus process the gesture input. On the contrary, if the centroid has not moved, the method 200 may proceed to operation 220 and the processor 124 may process the touch inputs. After operations 220, 222 and the method 200 may proceed to the end state 224.

CONCLUSION

The foregoing description has broad application. For example, while examples disclosed herein may focus on computing devices having touch interfaces, it should be appreciated that the concepts disclosed herein may equally apply to substantially any other type of communication devices. Similarly, although the touch detection is discussed with touch screens, the devices and techniques disclosed herein are equally applicable to other types of capacitive coupling systems. Accordingly, the discussion of any embodiment is meant only to be exemplary and is not intended to suggest that the scope of the disclosure, including the claims, is limited to these examples.

What is claimed is:
1. A computing device configured to detect a user input comprising:
   a processor;
   a touch interface in communication with the processor and configured to detect a touch input location corresponding to an object contacting a cover surface, wherein the touch interface comprises touch sensors positioned below the cover surface to produce a touch input region;

at least three force sensors in communication with the processor and configured to detect a force input corresponding to an object exerting a force on the cover surface; wherein the processor is configured to:
determine a touch centroid location based on at least a first touch input location and a second touch input location;
determine a force centroid location based on the force input;
determine when the force centroid location does not match the touch centroid location; and
in response to a determination that the force centroid location does not match the touch centroid location, reject at least one of the first touch input location and the second touch input location.

2. The computing device of claim 1, wherein the at least three force sensors comprise four force sensors.

3. The computing device of claim 1, wherein the touch interface is a touch display screen.

4. The computing device of claim 1, wherein the processor is further configured to determine a location and an amount of force applied outside the touch input region when the force centroid location does not match the touch centroid location.

5. A method for detecting user inputs to a computing device, comprising:
detecting, by a plurality of touch sensors positioned below a cover surface, two or more touch inputs on the cover surface;
detecting, by three or more force sensors positioned below the cover surface, one or more force inputs;
calculating, by a processor in communication with the force sensors, a force centroid based on the one or more force inputs;
determining, by the processor, whether a location of the force centroid is within a boundary around at least one of the two or more touch inputs, the boundary defined by a given circumference around the at least one of the two or more touch inputs; and
when the location of the force centroid is within the boundary, associating, by the processor, the one or more force inputs with the at least one of the two or more touch inputs; wherein
the given circumference is smaller than a display region of the cover surface.

6. The method of claim 5, further comprising when the force centroid is outside of the boundary, rejecting, by the processor, at least one of the two or more touch inputs.

7. The method of claim 5, further comprising:
determining, by the processor, when the force centroid corresponds to a button location; and
receiving, by the processor, a button input when the force centroid corresponds to the button location.

8. The method of claim 7, wherein the button is a virtual button positioned outside of a touch input region of the cover surface defined over the plurality of touch sensors.

9. A mobile computer configured to detect at least two types of user inputs comprising:
a processor;
a touch screen in communication with the processor and configured to detect a touch input corresponding to a user finger contacting the touch screen; and
at least three pressure sensors in communication with the processor and configured to detect a pressure input corresponding to an object applying pressure on a surface; wherein
the processor is configured to:
determine a touch location corresponding to the touch input;
in response to the pressure input, determine a pressure centroid location and whether the pressure centroid location is within a boundary around the touch location, the boundary being smaller than the touch screen and defined by a given distance around the touch location;
process the touch input by analyzing the pressure centroid location when the pressure centroid location is in the boundary; and
reject the touch input when the pressure centroid location is outside the boundary.

10. The mobile computer of claim 9, further comprising an enclosure operably connected to the touch screen and the at least three pressure sensors; and
a cover surface extending over at least a portion of the touch screen and the at least three pressure sensors.

11. The mobile computer of claim 9, wherein the at least three pressure sensors are strain gauges.

12. The mobile computer of claim 9, wherein the touch screen comprises a capacitive touch screen and the touch input is detected based on a change in capacitance.

13. The mobile computer of claim 9, wherein:
the touch screen comprises touch sensors positioned over a display region; and
when the centroid location moves from outside the display region to over the display region, the processor is configured to process the touch input as a gesture.

14. The mobile computer of claim 9, wherein the processor is further configured to:
determine when the pressure centroid location corresponds to a button location; and
when the pressure centroid location corresponds to the button location generate a button input.

15. The method of claim 5, further comprising processing, by the processor, a user input as a gesture when the location of the force centroid moves from outside the display region to over the display region.

16. The computing device of claim 1, wherein the processor is further configured to associate the force centroid with at least one of the first touch input location and the second touch input location when the force centroid location is within a predetermined boundary defined by a given distance around the touch centroid location.

17. The computing device of claim 1, wherein the processor is further configured to process the touch input as a gesture in response to the force centroid location moving from outside a display region to over the display region.

18. The computing device of claim 17, wherein the touch interface is configured to detect the touch input location over the display region.

19. The method of claim 5, further comprising processing, by the processor, a user input as a gesture when the location of the force centroid moves from outside the display region to over the display region.

* * * * *